US 8,296,649 B2

(12) United States Patent
Morford et al.

(10) Patent No.: US 8,296,649 B2
(45) Date of Patent: *Oct. 23, 2012

(54) METHOD, GRAPHICAL INTERFACE AND COMPUTER-READABLE MEDIUM FOR GENERATING A PREVIEW OF A REFORMATTED PREVIEW SEGMENT

(75) Inventors: Randon Morford, Lehi, UT (US); Matthew D. Cupal, Providence, UT (US); Joseph Romriell, Alpine, UT (US); Mitchell Holyoak, West Jordan, UT (US); Carlo Johannes Bos, West Jordan, UT (US)

(73) Assignee: Sorenson Media, Inc., Salt Lake City, UT (US)

( * ) Notice: Subject to any disclaimer, the term of this patent is extended or adjusted under 35 U.S.C. 154(b) by 621 days.

This patent is subject to a terminal disclaimer.

(21) Appl. No.: 11/140,784

(22) Filed: May 31, 2005

(65) Prior Publication Data
US 2006/0271836 A1    Nov. 30, 2006

(51) Int. Cl.
*G06N 3/00*     (2006.01)
(52) U.S. Cl. .................... 715/249; 715/248; 715/731
(58) Field of Classification Search .................. 715/203, 715/204, 273, 234, 205
See application file for complete search history.

(56) References Cited

U.S. PATENT DOCUMENTS

| | | | |
|---|---|---|---|
| 5,260,781 A | 11/1993 | Soloff et al. | |
| 5,440,336 A | 8/1995 | Buhro et al. | |
| 5,691,770 A | 11/1997 | Keesman et al. | |
| 5,721,912 A | 2/1998 | Stepczyk et al. | |
| 5,737,559 A | 4/1998 | Orton et al. | |
| 5,760,767 A | 6/1998 | Shore et al. | |
| 6,055,368 A | 4/2000 | Kunioka | |
| 6,097,435 A | 8/2000 | Stanger et al. | |
| 6,104,395 A | 8/2000 | Alimpich et al. | |
| 6,148,034 A | 11/2000 | Lipovski | |
| 6,236,802 B1 | 5/2001 | Yamamoto | |
| 6,407,756 B1 | 6/2002 | Sontag et al. | |
| 6,415,327 B1 | 7/2002 | Beckerman et al. | |
| 6,429,880 B2 | 8/2002 | Marcos et al. | |
| 6,453,471 B1 * | 9/2002 | Klosterman | 725/41 |
| 6,456,334 B1 | 9/2002 | Duhault | |
| 6,487,713 B1 | 11/2002 | Cohen et al. | |
| 6,542,166 B1 | 4/2003 | Washington et al. | |
| 6,560,288 B1 | 5/2003 | Gilbert et al. | |
| 6,636,215 B1 | 10/2003 | Greene | |
| 6,654,031 B1 | 11/2003 | Ito et al. | |
| 6,658,626 B1 | 12/2003 | Aiken | |

(Continued)

OTHER PUBLICATIONS

Gatt, Fiona, MP3 Conversion and Burning MP3 CDs, VIA Arena website, May 6, 2005, 3 pages, http://www.viaarena.com/default.aspx?PageID=5&ArticleID=389&printer=true.

(Continued)

*Primary Examiner* — Kyle Stork
(74) *Attorney, Agent, or Firm* — TraskBritt

(57) ABSTRACT

A method, graphical interface and computer-readable medium for generating a preview of a reformatted preview segment of a selected input file. A preview pane is displayed in a single window and includes preview controls including a file timeline indicator configured to graphically depict a length of a selected input file. Preview in and out markers are displayed and configured to define a preview segment of the selected input file. The preview segment is reformatted into a reformatted preview segment according to the reformatting process associated with the selected input file. The reformatted preview segment is displayed in the preview pane.

21 Claims, 13 Drawing Sheets

U.S. PATENT DOCUMENTS

| | | |
|---|---|---|
| 6,731,815 B1 | 5/2004 | Hu |
| 6,757,851 B1 | 6/2004 | Park et al. |
| 6,778,193 B2 | 8/2004 | Biebesheimer et al. |
| 6,785,012 B2 | 8/2004 | Okazawa |
| 6,847,686 B2 | 1/2005 | Morad et al. |
| 6,871,123 B2 | 3/2005 | Shimel |
| 7,010,364 B1 | 3/2006 | Singh et al. |
| 7,020,876 B1 | 3/2006 | Deitz et al. |
| 7,165,226 B2 | 1/2007 | Thurner et al. |
| 7,185,317 B2 | 2/2007 | Fish et al. |
| 7,225,135 B2 | 5/2007 | Thomas |
| 7,272,815 B1 | 9/2007 | Eldridge et al. |
| 7,290,206 B2 | 10/2007 | Wang et al. |
| 7,403,942 B1 | 7/2008 | Bayliss |
| 7,783,171 B2 * | 8/2010 | Ito ................................. 386/241 |
| 2001/0029505 A1 | 10/2001 | Gaudette et al. |
| 2002/0002625 A1 | 1/2002 | Vange et al. |
| 2002/0048212 A1 | 4/2002 | Hill et al. |
| 2002/0124061 A1 | 9/2002 | Mossman |
| 2002/0128967 A1 | 9/2002 | Meyer et al. |
| 2002/0154156 A1 * | 10/2002 | Moriwake et al. ............ 345/716 |
| 2002/0186248 A1 | 12/2002 | Ramanathan et al. |
| 2003/0081260 A1 | 5/2003 | Suzuki et al. |
| 2003/0090522 A1 | 5/2003 | Verhaar |
| 2003/0142128 A1 | 7/2003 | Reulein et al. |
| 2003/0158913 A1 | 8/2003 | Agnoli et al. |
| 2003/0212542 A1 | 11/2003 | Lee et al. |
| 2003/0235338 A1 | 12/2003 | Dye |
| 2004/0002950 A1 | 1/2004 | Brennan et al. |
| 2004/0008224 A1 | 1/2004 | Molander et al. |
| 2004/0015566 A1 | 1/2004 | Anderson et al. |
| 2004/0036698 A1 | 2/2004 | Thurner et al. |
| 2004/0070689 A1 | 4/2004 | Mochizuki et al. |
| 2004/0109453 A1 | 6/2004 | Wirth |
| 2004/0128003 A1 | 7/2004 | Frampton et al. |
| 2004/0172446 A1 | 9/2004 | Dorman et al. |
| 2004/0189690 A1 * | 9/2004 | Poslinski et al. .............. 345/719 |
| 2004/0210500 A1 | 10/2004 | Sobel et al. |
| 2004/0230911 A1 | 11/2004 | Bent et al. |
| 2004/0254949 A1 | 12/2004 | Amirthalingam |
| 2005/0002401 A1 * | 1/2005 | Coleman et al. ........... 370/395.4 |
| 2005/0039211 A1 | 2/2005 | Washino |
| 2005/0102321 A1 | 5/2005 | David et al. |
| 2005/0172018 A1 | 8/2005 | Devine et al. |
| 2005/0187906 A1 | 8/2005 | Madan et al. |
| 2005/0188174 A1 | 8/2005 | Guzak et al. |
| 2005/0188302 A1 | 8/2005 | Julitz et al. |
| 2005/0216421 A1 | 9/2005 | Barry et al. |
| 2005/0286361 A1 * | 12/2005 | Urushihara et al. ......... 369/47.1 |
| 2005/0286805 A1 | 12/2005 | Yoshida |
| 2005/0289182 A1 | 12/2005 | Pandian et al. |
| 2006/0036568 A1 | 2/2006 | Moore et al. |
| 2006/0045364 A1 | 3/2006 | Mihara et al. |
| 2006/0048155 A1 | 3/2006 | Wu et al. |
| 2006/0056671 A1 | 3/2006 | Ghosh et al. |
| 2006/0059461 A1 | 3/2006 | Baker et al. |
| 2006/0064313 A1 | 3/2006 | Steinbarth et al. |
| 2006/0074869 A1 * | 4/2006 | Rosenberg et al. ............... 707/3 |
| 2006/0101051 A1 | 5/2006 | Carr et al. |
| 2006/0142989 A1 | 6/2006 | Ramanathan et al. |
| 2006/0265323 A1 | 11/2006 | Winter et al. |
| 2007/0112714 A1 | 5/2007 | Fairweather |
| 2007/0294284 A1 | 12/2007 | Evans |
| 2008/0306979 A1 | 12/2008 | Wang et al. |

OTHER PUBLICATIONS

Peter Luijer, "The one and only MP3Cutter 4.0 Freeware editor," Feb. 15, 2004, paragraphs titled "What is Mp3Cutter 4 capable of?" and "Show me what it looks like." Available World Wide Web http://.web.archive .org/web/20040215192938/horne/hccnet.nl.pluijer/main.html.

Dixon, Douglas, "Video Compression Tools", May 5, 2005, Manifest Technology, LLC, 13 pages.

* cited by examiner

METHOD, GRAPHICAL INTERFACE AND COMPUTER-READABLE MEDIUM FOR GENERATING A PREVIEW OF A REFORMATTED PREVIEW SEGMENT

CROSS-REFERENCE TO RELATED APPLICATIONS

This application is related to application Ser. No. 11/141,434, filed May 31, 2005, which is currently pending. This application is also related to application Ser. No. 11/140,773, filed May 31, 2005, now U.S. Pat. No. 7,885,979, issued Feb. 8, 2011.

BACKGROUND OF THE INVENTION

1. Field of the Invention

This invention relates generally to the field of a graphical interface and, more particularly, to a graphical interface for intuitively reformatting data in a computer-based system.

1. State of the Art

Typically, the sequential execution of a processing program on multiple data files has required vigilant attention and continued re-execution of the processing programs. The continued re-execution of processing programs on data files is typically mundane and an inefficient use of user skills. Additionally, the latency between user-initiated subsequent re-executions of the processing program interjects significant delays in the processing of multiple data files.

Accordingly, the creation of a batch job enables a user to create a process file that identifies various input data files and associates one or more processing programs with the data files. The batch job or process is then executed with each of the included input data files being processed as defined in the batch job. Such an approach removes the mundane re-execution of the processing programs and significantly reduces the latency between successive re-executions of the processing programs.

The cryptic nature and cumbersome formation of batch jobs has remained as one of the inhibiting factors to the widespread use of batch jobs. Typically, batch jobs are formed by creating an executable file including paths and sources of such files. The batch file is manually edited and regularly contains computer jargon-based commands that may be unintuitive. Additionally, formation of repetitive commands requires iterative reentry of commands and designations of source files.

Typically, an encoding or reformatting process relies upon trial and error methods. Reformatting generally takes a significant amount of user time and the user would like to see how certain reformatting options modify the perception of the data. Therefore, it would be desirable to provide a method and system for creating a reformatting preview without the latencies of encoding or reformatting an entire file.

BRIEF SUMMARY OF THE INVENTION

The present invention, in exemplary embodiments, relates to a method, graphical interface and computer-readable medium for reformatting data. One embodiment of the present invention comprises a method for generating a preview of a reformatted preview segment wherein a review pane is displayed in a single window and includes preview controls including a file timeline indicator configured to graphically depict a length of a selected input file and a play head configured to graphically depict a displayed location within the selected input file. Preview in and out markers are displayed and configured to define a preview segment of the selected input file. The preview segment is reformatted into a reformatted preview segment according to the reformatting process associated with the selected input file. The reformatted preview segment is displayed in the preview pane.

In an additional embodiment of the present invention, a graphical interface for generating a preview of a reformatted preview segment of reformatted data includes a reformatting second interface pane in a single window wherein the reformatting second interface pane includes a reformatting batch job graphical element including at least one graphical element depicting at least one input file. The graphical interface further includes a preview pane of the single window including preview controls, wherein the preview controls include a file timeline indicator configured to graphically depict a length of a selected input file in the reformatting second interface pane and a play head configured to graphically depict a displayed location within the selected input file. The preview controls further include a preview in marker and a preview out marker configured to graphically depict a preview segment of the selected input file. The graphical interface further includes a means for reformatting the preview segment of the selected input file into the reformatted preview segment according to a reformatting process associated to the selected input file. A reformatted preview display displays the reformatted preview segment of the reformatted data in the single window.

In yet another embodiment of the present invention, a computer-readable medium having computer-executable instructions thereon for performing the method for generating a preview of a reformatted preview segment wherein a review pane is displayed in a single window and includes preview controls including a file timeline indicator configured to graphically depict a length of a selected input file and a play head configured to graphically depict a displayed location within the selected input file. Preview in and out markers are displayed and configured to define a preview segment of the selected input file. The preview segment is reformatted into a reformatted preview segment according to the reformatting process associated with the selected input file. The reformatted preview segment is displayed in the preview pane.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Referring in general to the following description and accompanying drawings, various aspects of the present invention are illustrated to show its structure and method of operation. Common elements of the illustrated embodiments are designated with like numerals. It should be understood the figures presented are not meant to be illustrative of actual views of any particular portion of the actual structure or method, but are merely idealized representations which are employed to more clearly and fully depict the present invention.

Figure 1:
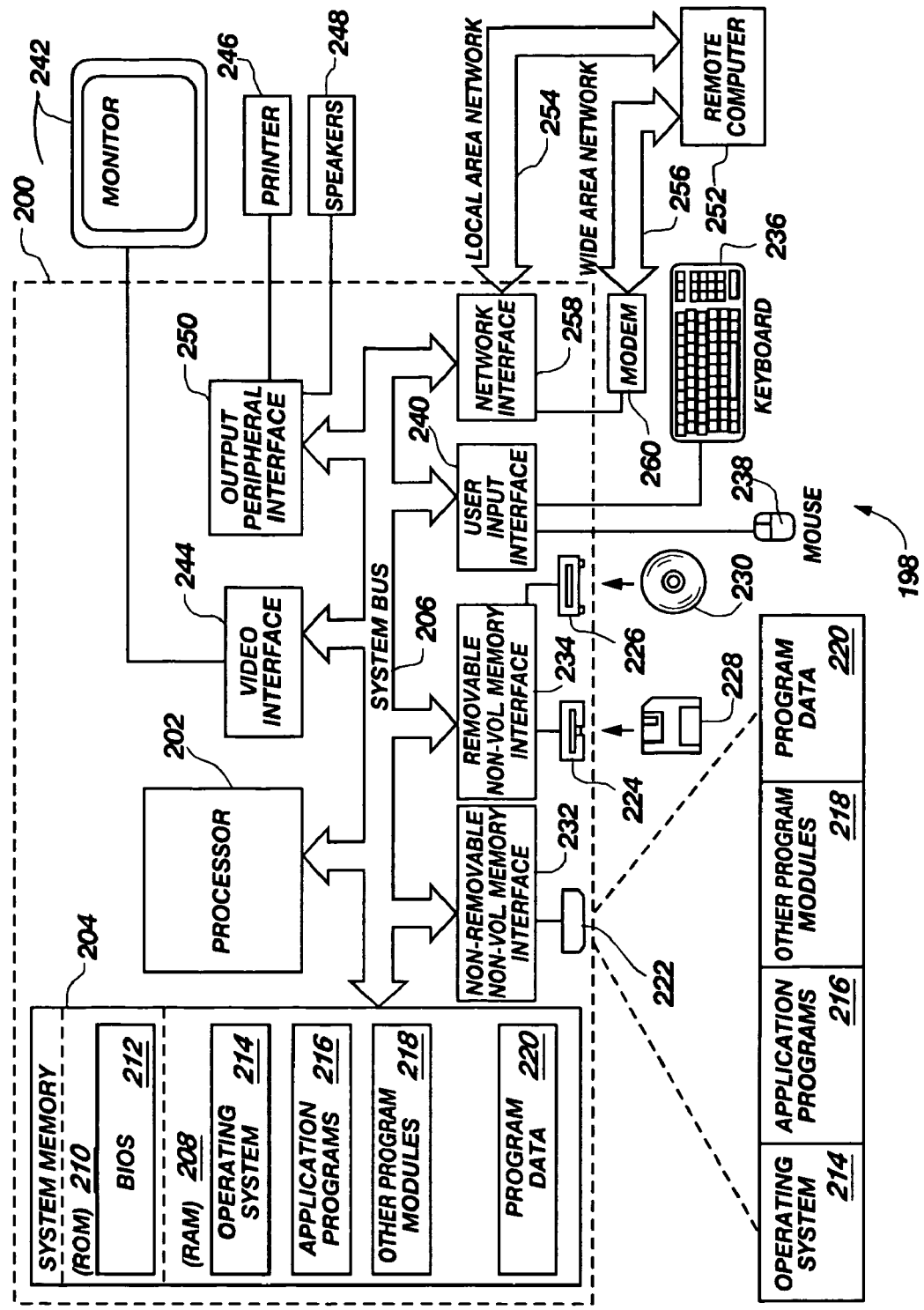
FIG. 1 is a block diagram of a computing system for configuring a batch job process, in accordance with an embodiment of the present invention.

FIG. 1 is block diagram of a computing system for configuring and executing a batch job, in accordance with an embodiment of the present invention. Computing system 198 illustrates a suitable program-executing environment and is only one example of a suitable computing system and is not intended to be limiting of the scope of the various embodiments of the present invention. The illustrated computing system should not be interpreted as having any requirement relating to any one of the components illustrated in the exemplary computing system 198.

One or more of the various embodiments of the present invention may be described in the context of computer-executable instructions, such as program modules being executed by a computer. Generally, program modules include routines, programs, objects, components, data structures, etc. that perform particular tasks. Those of ordinary skill in the art will appreciate that the various embodiments of the present invention may be practiced with other computing configurations, including hand-held devices, multiprocessor devices, microprocessor-based devices, or microcontroller-based devices. Furthermore, one or more elements of the computing system may be linked through a communication network (not shown) and may further be arranged in a distributed computing environment wherein portions of the computing functionality may be partitioned and distributed on a first computing environment while a second portion may be distributed on a second computing environment, an example of which may include a client-server partitioning of computing resources.

An exemplary computing system 198 includes a general purpose computer 200 including a processor 202, a system memory 204, and a system bus 206 for operatively coupling the various system components to allow accessing by processor 202. Computer 200 typically includes a variety of computer-readable media which, by way of example and not limitation, may include storage media and communication media. System memory 204 includes computer-readable media in the form of volatile and/or nonvolatile memory respectively illustrated as random access memory (RAM) 208 and read only memory (ROM) 210. Nonvolatile memory (ROM) 210 may further include a basic input/output system (BIOS) 212 containing routines for transferring information between elements within computer 200. Volatile memory (RAM) 208 typically contains data and program modules that are readily accessible to processor 202. By way of example and not limitation, volatile memory (RAM) 208 is illustrated as including an operating system 214, application programs 216, other program modules 218, and program data 220.

Computer 200 may also include other removable/nonremovable, volatile/nonvolatile media for storing computer-readable/executable instructions and/or data. By way of example and not limitation, computer 200 may further include a hard disk drive 222 and may be configured to read or write to nonremovable nonvolatile media, one or more removable nonvolatile disk drives 224, 226 which may be configured to interface with removable, for example, magnetic media 228 and/or removable optical media 230. Other removable/nonremovable, volatile/nonvolatile computer storage media may also be used and may include, but are not limited to, tape cassettes, memory cards, disks, solid state memory devices, and the like. The aforementioned media devices are coupled to the system bus 206 through one or more interfaces 232, 234.

Input devices may also be included within computing system 198 which enable, for example, a user through a user or graphical interface to enter commands and information into computer 200 through input devices such as a keyboard 236 and/or a pointing device 238. These and other input devices are often connected to the processor 202 through a user input interface 240 that is coupled to the system bus 206 but may be coupled to other interfaces or bus structures such as parallel ports or universal serial bus (USB) ports. Computing system 198 may further include output devices such as a display 242 connected via a video interface 244 to the system bus 206. Computing system 198 may further include other output devices such as printers 246 and speakers 248 which may be connected to the system bus 206 through an output peripheral interface 250.

As stated, computer 200 may operate in a networked environment using logical connections to one or more remote computers, such as a remote computer 252. Remote computer 252 may be a computer similar to computer 200 containing similar elements. The logical connections between computer 200 and remote computer 252 are depicted to include one or more of a local area network 254 and/or a wide area network 256, coupled to system bus 206 through one or more network interfaces 258 or modems 260. While the various elements of computing system 198 may be illustrated to be inclusive or exclusive of computer 200, such a representation is illustrative and not to be considered as limiting.

Although many other internal components of computer 200 are not shown, it is appreciated that such components and their interconnections and interfaces are known by those of ordinary skill in the art. Accordingly, additional details and specifics of computer 200 are not further disclosed in connection with the various embodiments of the present invention.

Figure 2:
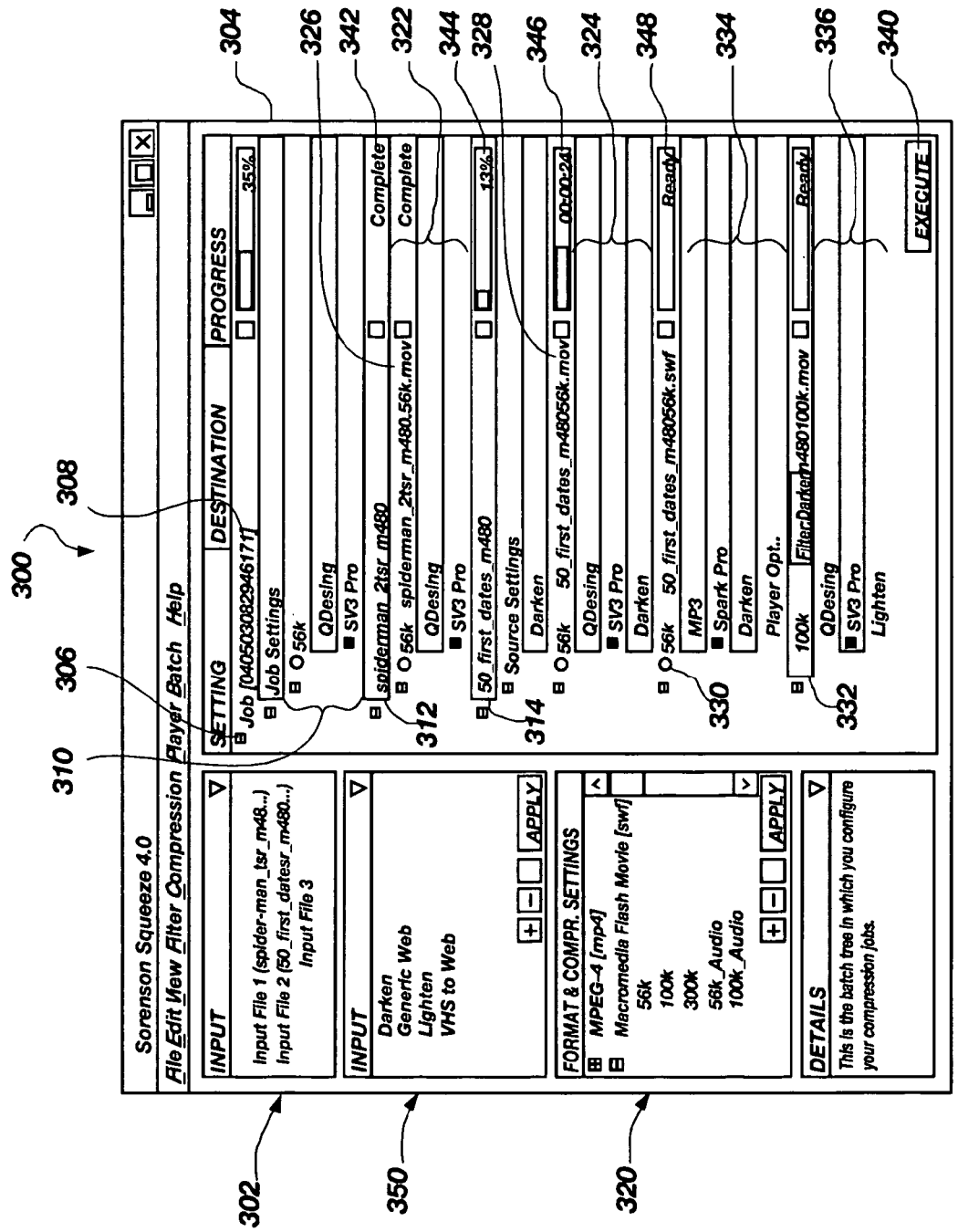
FIG. 2 is a graphical interface for configuring a batch job process, in accordance with an embodiment of the present invention.

Computer 200 further includes application programs 216 that generate a user or graphical interface rendered in conjunction with processor 202 and displayed for user perception at a display 242. FIG. 2 illustrates a rendering of a graphical interface for configuring a batch job, in accordance with an embodiment of the present invention. As stated, the creation of a batch job has hitherto been nonintuitive and complex in formation. According to one or more embodiments of the present invention, FIG. 2 illustrates a graphical interface 300 for configuring and executing a batch process. The graphical interface 300 includes a rendering in a graphical window of a plurality of interface panes for use in configuring and executing a batch job and may include pulldown menus for presenting conventional commands.

In graphical interface 300, an input file pane or first interface pane 302 is configured for displaying and enabling selection of at least one graphical element respectively corresponding to at least one input file. Selection of a graphical element within a first interface pane may present a list of available input files which may be configured into a batch job for undergoing a reformatting process.

The graphical interface 300 further includes a second interface pane configured for forming a depiction of graphical elements corresponding to a logical batch job tree hierarchically representing a batch job. The second interface pane 304 may receive therein the graphical elements representing the selection of one or more input files from the first interface pane 302. In operation, a user selects the graphical elements corresponding to the one or more input files from first interface pane 302 and "drags" the graphical elements corresponding to the input files into the second interface pane 304. The process of dragging the graphical elements corresponding to the input files into the batch or second interface pane 304 creates a batch job tree if one had not been previously created or if one has been created, the act of dragging a graphical element corresponding to a new input file into the batch window or second interface pane 304 adds the input file to an existing batch job tree. FIG. 2 generally illustrates a batch job tree 306 including a batch job identifier 308, graphical elements corresponding to global batch job settings 310 and graphical elements corresponding to one or more individual input files 312, 314. Each of the input files are associated with a corresponding branch of the batch job tree 306 when graphical elements corresponding to the input files are "dragged" from the first interface pane 302 to the second interface pane 304. Accordingly, input file 312 is associated with one branch of the batch job tree while input file 314 is associated with another branch of the batch job tree.

A reformatting process pane or third interface pane 320 within graphical interface 300 is configured for associating at least one reformatting process to each of the input files on each branch of the batch job tree 306 when a graphical element respectively corresponding to a reformatting process is moved from the third interface pane 320 to the batch job tree 306 in the second interface pane 304. A graphical element corresponding to a reformatting process may be globally associated wherein the reformatting process is performed or replicated for each input file, or alternatively, the reformatting process may be locally associated to a specific one of an input file formerly associated with a branch of the batch job tree. Both global and local associations are illustrated with respect to the second interface pane 304 and are further described below with respect to FIGS. 3-6. Specifically, global batch job settings 310 are replicated in each branch of the batch job tree corresponding to input files 312 and 314 as illustrated with respective replicated global settings 322, 324. Upon execution of the batch job, output files are generated as indicated by corresponding graphical elements 326, 328. Additional reformatting processes may be associated with an input file, for example, input file 314 has associated therewith additional reformatting processes 330, 332, as graphically illustrated by respective batch job settings 334, 336.

The graphical interface 300 may further include a fourth interface pane configured for associating at least one filter to one input file in a branch of the batch job tree. In many cases input files may benefit from application of one or more particular types of data-conditioning filters prior to undergoing a reformatting process. Accordingly, a specific graphical element corresponding to a respective filter may be "dragged" from the fourth interface pane 350 into the second interface pane 304 and associated either locally or globally to one or more input files in the batch job tree as previously described. When a batch job tree is completely populated, then execution of the batch job may be initiated by selection of a graphical element such as a reformat selector 340. A reformat processing status may be displayed by one or more processing status graphical elements 342-348 indicating the processing state of each of the reformatting processes.

Figure 3:
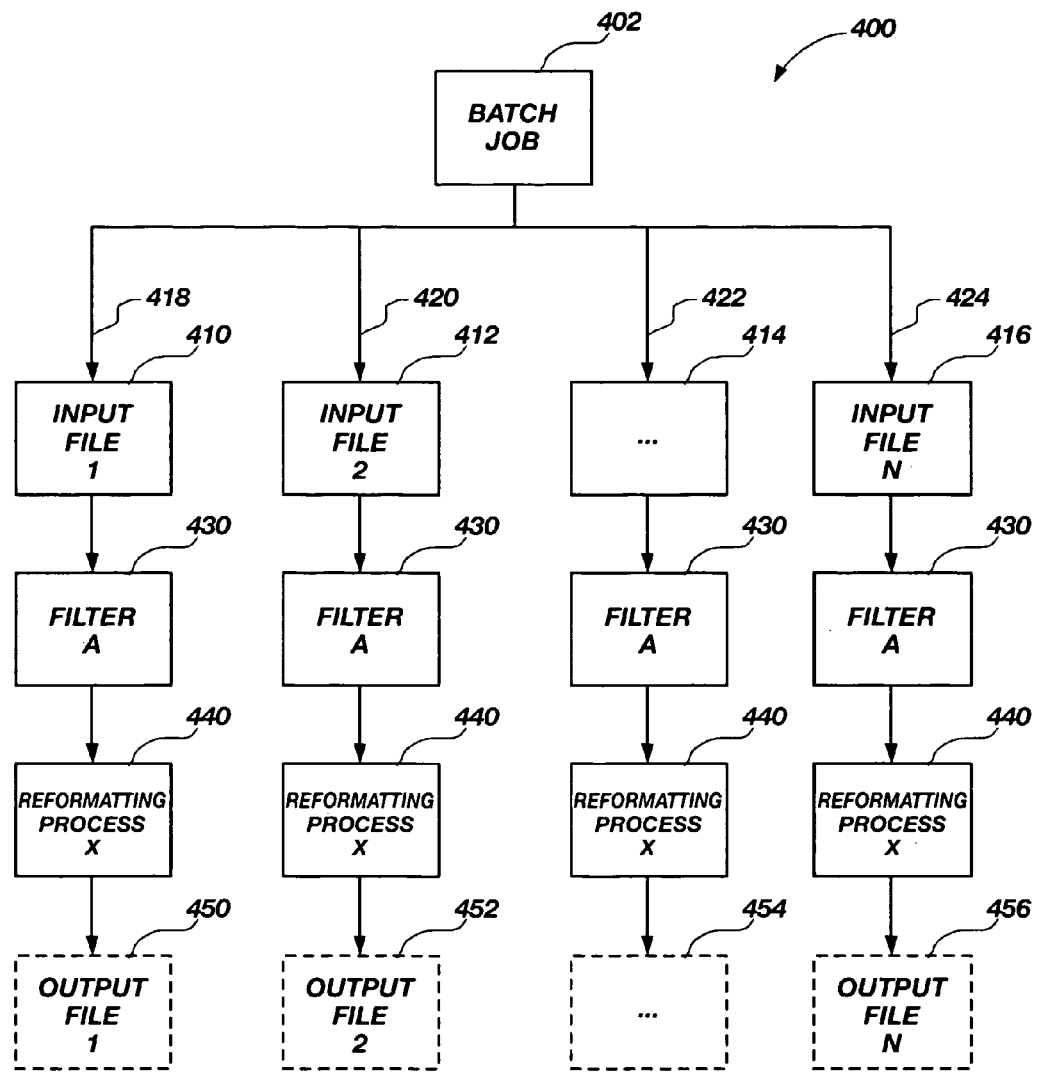
FIG. 3 is a structural diagram of a batch job tree configuration of a batch job, in accordance with an embodiment of the present invention.

FIG. 3 is a structural diagram of the associated hierarchy of a batch job tree as relating to a batch job, in accordance with an embodiment of the present invention. A batch job tree 400 is populated to form a batch job 402. As described, a batch job 402 is formed by defining a batch job tree 400 and populating the framework with one or more input files, optional filters, and one or more reformatting processes.

In the presently illustrated embodiment of the present invention, batch job tree 400 is constructed according to global associations as previously described. For example, one or more input files 410-416 are graphically selected from the first interface pane 302 (FIG. 2) and graphically repositioned into the batch job pane or second interface pane 304 (FIG. 2) causing the generation of a batch job tree 400 and the formation of a corresponding number of branches 418-424. Each of the input files 410-416 is associated with a respective branch 418-424 of batch job tree 400. Subsequently, an optional association of one or more filters 430, when applied globally, becomes associated with each of the branches 418-424 of the batch job tree 400. Additionally, a reformatting process 440, when globally applied to batch job tree 400, becomes associated with each of the branches 418-424 and, when executed, results in the generation of output files 450-456.

Figure 4:
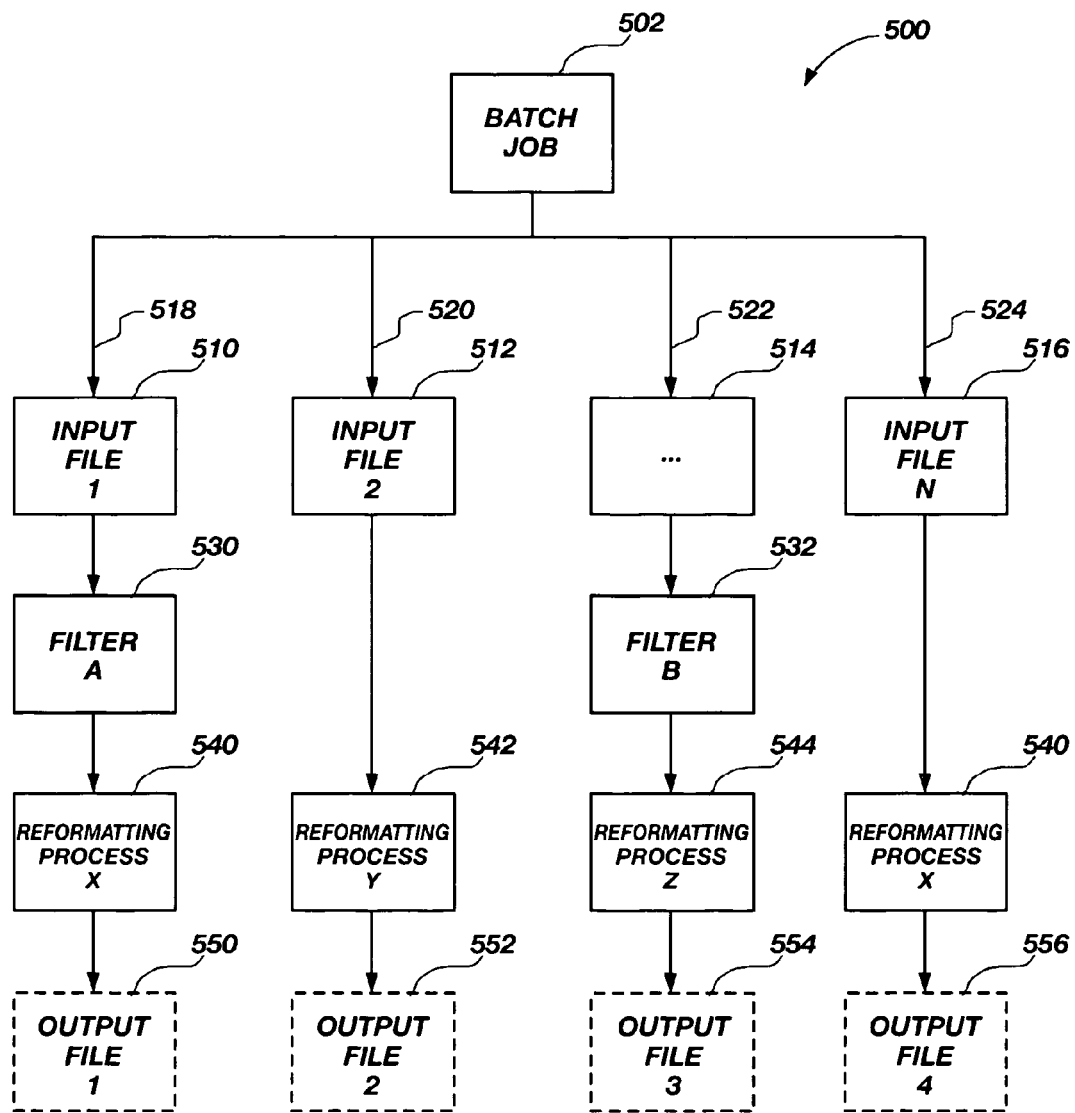
FIG. 4 is a structural diagram of a batch job tree configuration of a batch job, in accordance with another embodiment of the present invention.

FIG. 4 is a structural diagram of the associated hierarchy of a batch job tree as relating to a batch job, in accordance with another embodiment of the present invention. A batch job tree 500 is populated to form a batch job 502. As described, a batch job 502 is formed by defining a batch job tree 500 and populating the framework with one or more input files, optional filters, and one or more reformatting processes.

In the presently illustrated embodiment of the present invention, batch job tree 500 is constructed according to local associations as previously described. For example, one or more input files 510-516 are graphically selected from the first interface pane 302 (FIG. 2) and graphically repositioned into the batch job pane or second interface pane 304 (FIG. 2) causing the generation of a batch job tree 500 and the formation of a corresponding number of branches 518-524. Each of the input files 510-516 is associated with a respective branch 518-524 of batch job tree 500. Subsequently, an optional association of one or more filters 530, 532, when applied locally, become associated with the selected individual input file. For example, filter 530 is associated locally with branch 518 of batch job tree 500. Filter 532 is similarly locally associated with input file 514. Accordingly, the filter 530 is only applied to the input file 510 when the batch job is executed. Similarly, FIG. 4 illustrates the local association of reformatting processes 540, 542, 544. In FIG. 4, reformatting process 540 is associated with an additional input file, namely input file 516. The execution of batch job 502 results in the generation of output files 550-556.

Figure 5:
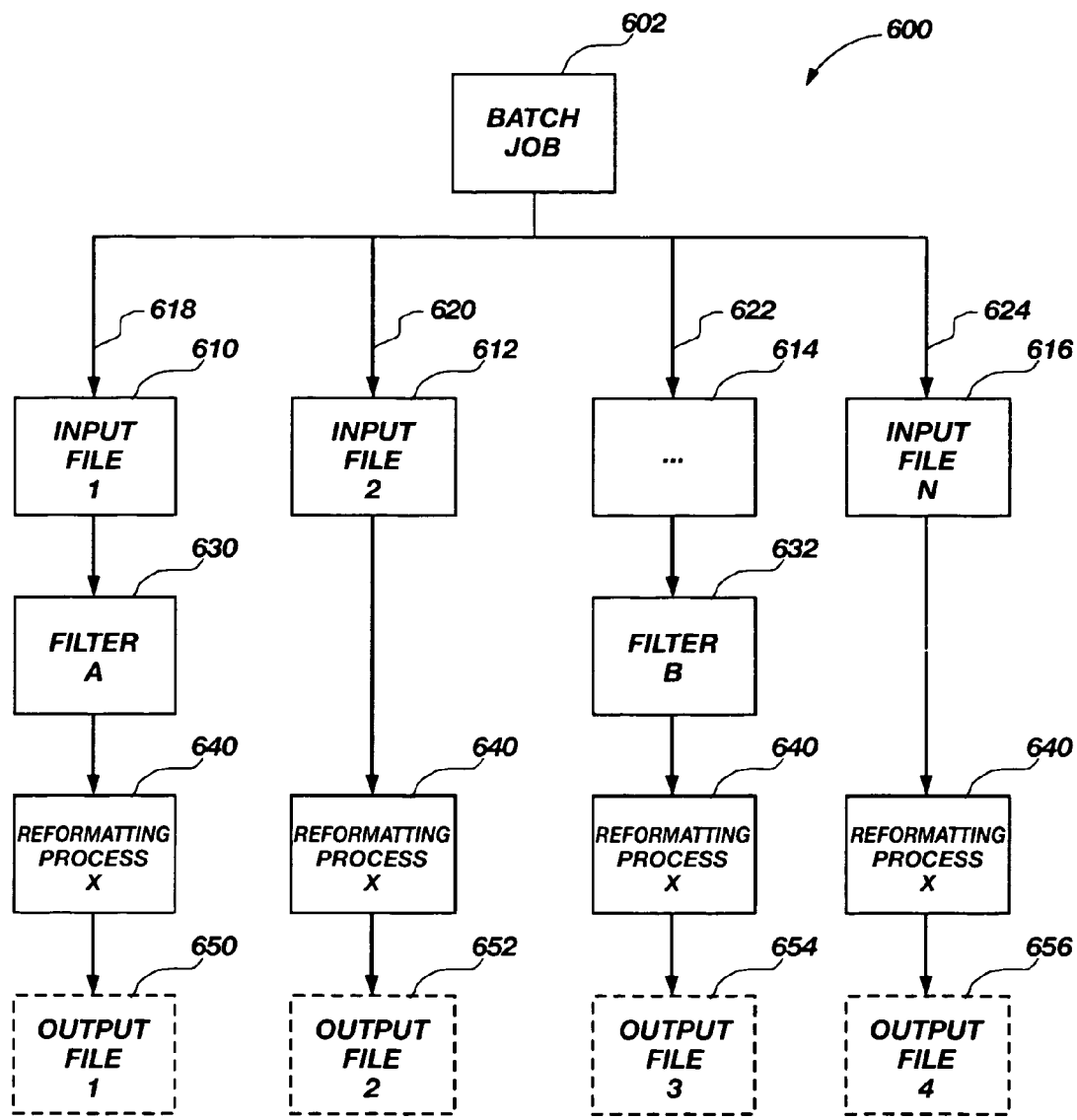
FIG. 5 is a structural diagram of a batch job tree configuration of a batch job, in accordance with a further embodiment of the present invention.

FIG. 5 is a structural diagram of the associated hierarchy of a batch job tree as relating to a batch job, in accordance with yet another embodiment of the present invention. A batch job tree 600 is populated to form a batch job 602. As described, a batch job 602 is formed by defining a batch job tree 600 and populating the framework with one or more input files, optional filters, and one or more reformatting processes.

In the presently illustrated embodiment of the invention, batch job tree 600 is constructed according to both global and local associations as previously described. For example, one or more input files 610-616 are graphically selected from first interface pane 302 (FIG. 2) and graphically repositioned into the batch job pane or second interface pane 304 (FIG. 2) causing the generation of a batch job tree 600 and the formation of a corresponding number of branches 618-624. Each of the input files 610-616 is associated with a respective branch 618-624 of batch job tree 600. Subsequently, an optional association of one or more filters 630, 632, when applied locally, become associated with the individual selected input file. For example, filter 630 is associated locally with the branch 618 of batch job tree 600. Filter 632 is similarly locally associated with input file 614. Accordingly, the filter 630 is only applied to the input file 610 when the batch job is executed. Additionally, a reformatting process 640, when globally applied to batch job tree 600, becomes associated with each of the branches 618-624 and, when executed, results in the generation of output files 650-656.

Figure 6:
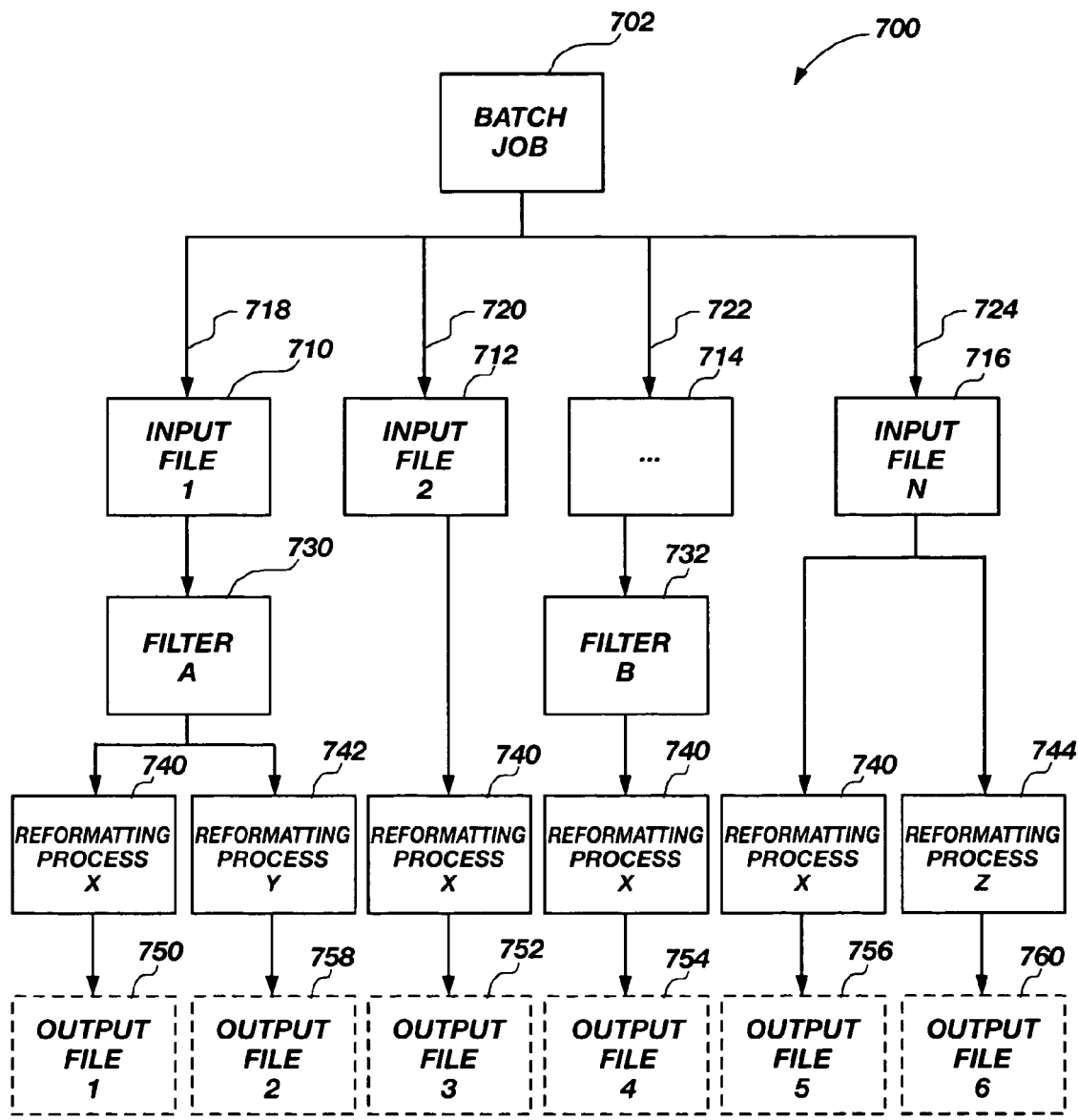
FIG. 6 is a structural diagram of a batch job tree configuration of a batch job, in accordance with yet another embodiment of the present invention.

FIG. 6 is a structural diagram of the associated hierarchy of a batch job tree as relating to a batch job, in accordance with yet a further embodiment of the present invention. A batch job tree 700 is populated to form a batch job 702. As described, a batch job 702 is formed by defining a batch job tree 700 and populating the framework with one or more input files, optional filters, and one or more reformatting processes.

In the presently illustrated embodiment of the invention, batch job tree 700 has been constructed according to both global and local associations previously described and further includes multiple reformatting processes for one or more branches of the batch job tree 700. For example, one or more input files 710-716 are graphically selected from the first interface pane 302 (FIG. 2) and graphically repositioned into the batch job pane or second interface pane 304 (FIG. 2) causing the generation of a batch job tree 700 and the formation of a corresponding number of branches 718-724. Each of the input files 710-716 is associated with a respective branch 718-724 of batch job tree 700. Subsequently, an optional association of one or more filters 730, 732, when applied locally, become associated with the individual input file selected. For example, filter 730 is associated locally with the branch 718 of batch job tree 700. Accordingly, the filter 730 is only applied to the input file 710 when the batch job is executed. Filter 732 is similarly locally associated with input file 714. Additionally, a reformatting process 740, when globally applied to batch job tree 700, becomes associated with each of the branches 718-724 and, when executed, results in the generation of output files 750-756. Additionally, the present embodiment illustrates the association of multiple reformatting files with specific ones of the input files. For example, FIG. 6 illustrates an additional reformatting process 742 being associated with the input file 710 and an additional reformatting process 744 being associated with the input file 716. These multiple reformatting file associations result in the generation of additional output files 758, 760 when the batch job is executed.

Figure 7:
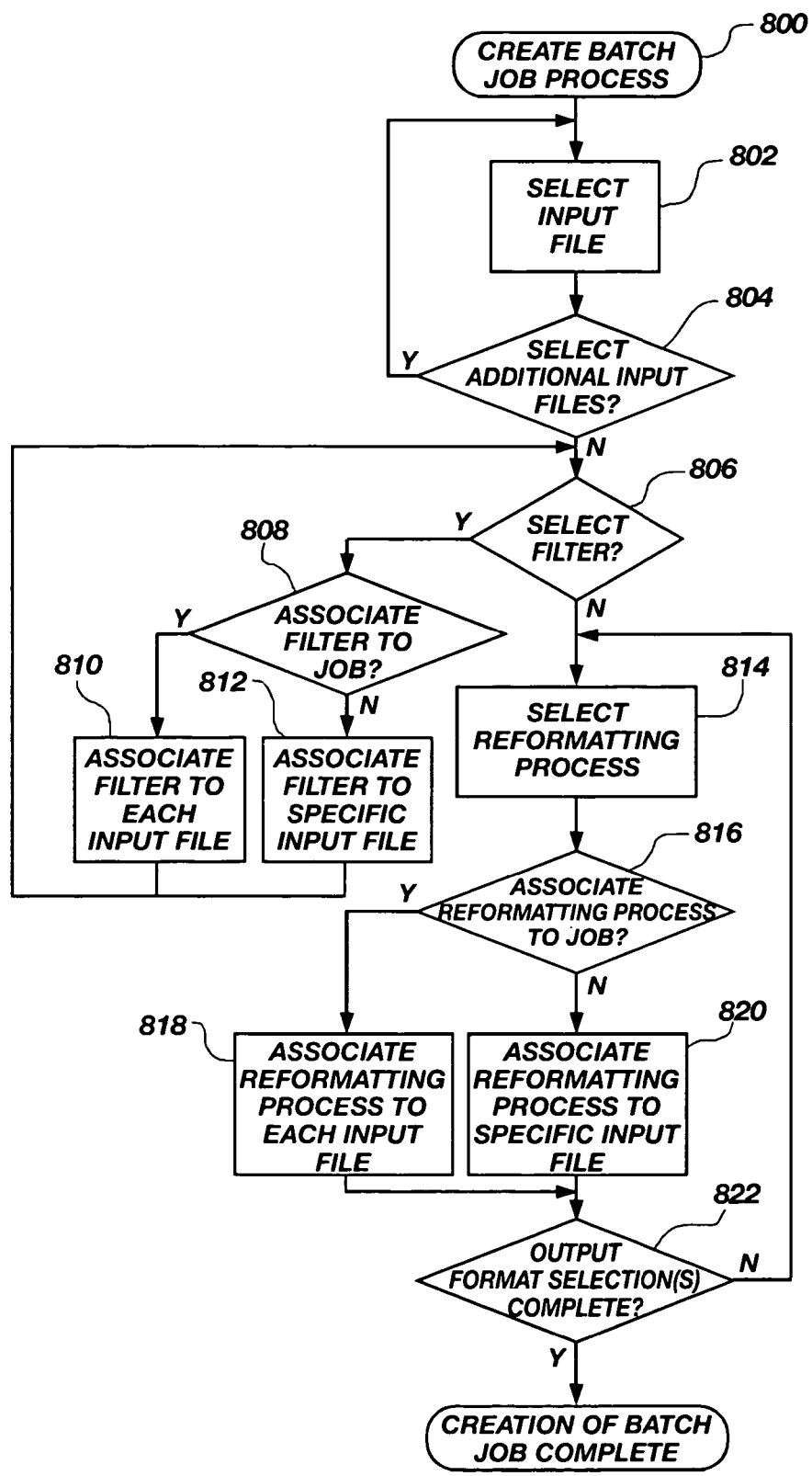
FIG. 7 is a flowchart of a method for configuring a batch job, in accordance with an embodiment of the present invention.

FIG. 7 is a flowchart of a method for configuring a batch job or batch process, in accordance with an embodiment of the present invention. Creation of a batch job process 800 includes selecting 802 an input file from a list of one or more possible input files. As previously described with reference to FIG. 2, a list of possible input files are represented by graphical elements in a first interface pane 302 (FIG. 2). A user selects one or more input files by selecting the corresponding graphical element and moving the one or more graphical elements to the second interface pane 304 (FIG. 2) until all of the input files have been determined 804 to be selected.

As stated, filters may improve certain characteristics of an input file prior to subjecting the input file to a reformatting process. As previously described with reference to FIG. 2, a list of possible filters is represented by graphical elements in a fourth interface pane 350 (FIG. 2). A user may select one or more filters by selecting the corresponding graphical element and moving the one or more graphical elements to the second interface pane 304 (FIG. 2). When a filter is selected 806, a determination 808 is made to globally associate 810 the filter with the entire job and therefore each of the input files or to locally associate 812 the filter with a specific one of the input files. When the filter has been associated with the appropriate one or more input files or when no filter has been selected, an output format is selected through the selection of a reformatting process for each input file.

Accordingly, the output format is determined by selecting 814 a reformatting process. As previously described with reference to FIG. 2, a list of possible reformatting processes may be represented by graphical elements in a third interface pane 320 (FIG. 2). A user selects one or more reformatting processes by selecting the corresponding graphical element and moving the one or more graphical elements to the second interface pane 304 (FIG. 2).

When a reformatting process is selected 814, a determination 816 is made to globally associate 818 the reformatting process with the entire batch job and therefore each of the input files or to locally associate 820 the reformatting process with a specific one of the input files. Additional reformatting processes may be applied to the various input files and when the desired reformatting processes are complete 822, then the creation of the batch job is complete.

Figure 8:
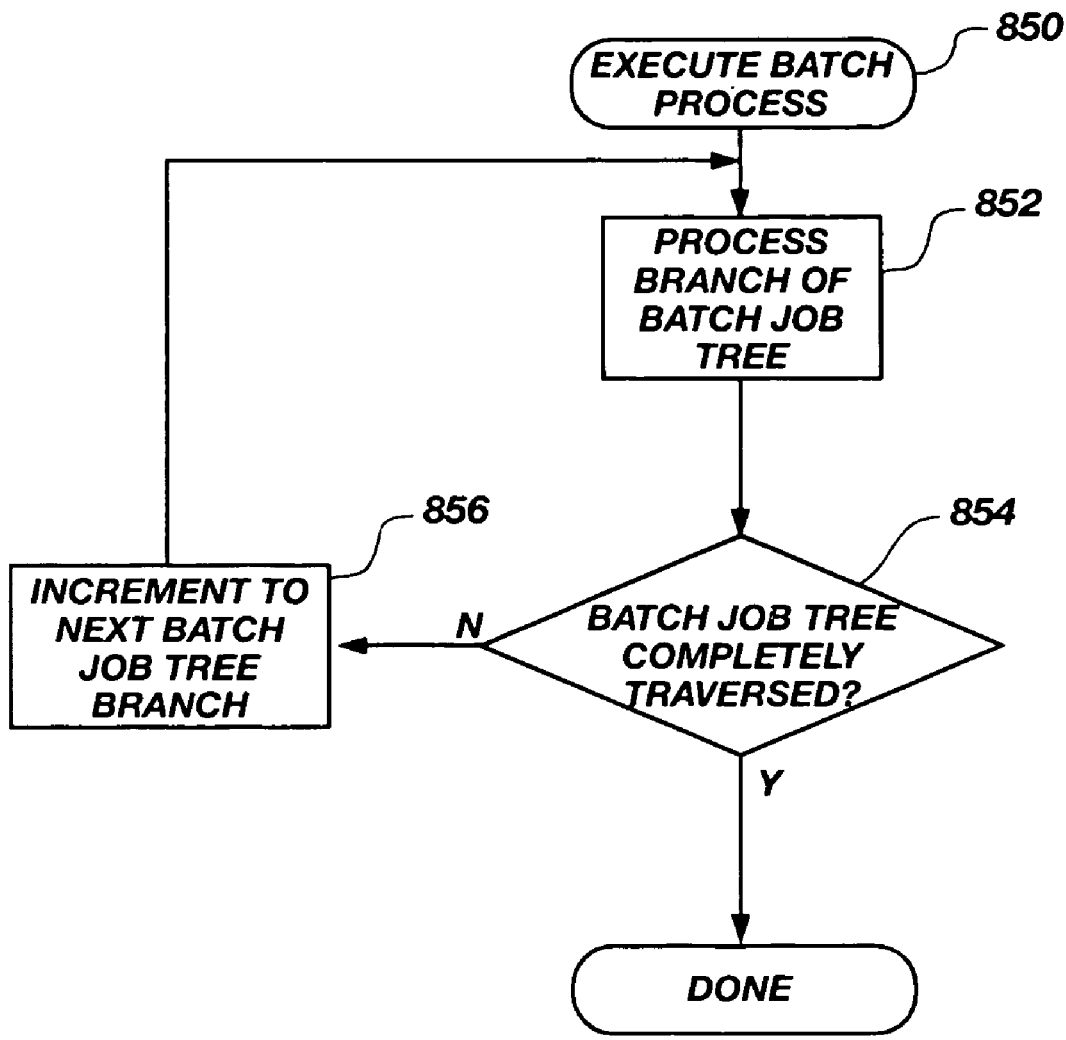
FIG. 8 is a flowchart of a method for executing a batch job, in accordance with an embodiment of the present invention.

FIG. 8 is a flowchart of a method for executing a batch job process, in accordance with an embodiment of the present invention. Execution of a batch job process 850 includes processing 852 a branch of the batch job tree. A determination 854 increments 856 processing of the batch job tree to another branch until a determination 854 is made identifying the complete traversal of the batch job tree created in accordance with the one or more embodiments previously described with reference to FIGS. 1-7.

A method, graphical interface and computer-readable medium for forming a batch job have been presented. Creation of a batch job through configuring a batch job tree simplifies the process for reformatting one or more input files. Exemplary reformatting processes include compression as well as incompatible format conversion. Extension of the graphical interface which includes graphical elements that update the progress of execution of the reformatting processes of the various branches of the batch job tree are also contemplated and illustrated in FIG. 2. Input files may include video and/or audio files that are desirably reformatted into files that are compatible for playing by various media players known by those of ordinary skill in the art. Audio and video reformatting may include compression or reformatting through selectable Coder/Decoders (CODECs) while filtering options may include modifications to settings such as contrast, brightness, Gamma, etc.

Further hierarchy may be included in the generation of output files for maintaining a more intuitive file structure.

Additionally, local and global associations of filters and reformatting processes may be distinguished through contrast in color or otherwise when displayed as graphical elements in the graphical interface of FIG. 2.

Figure 9:
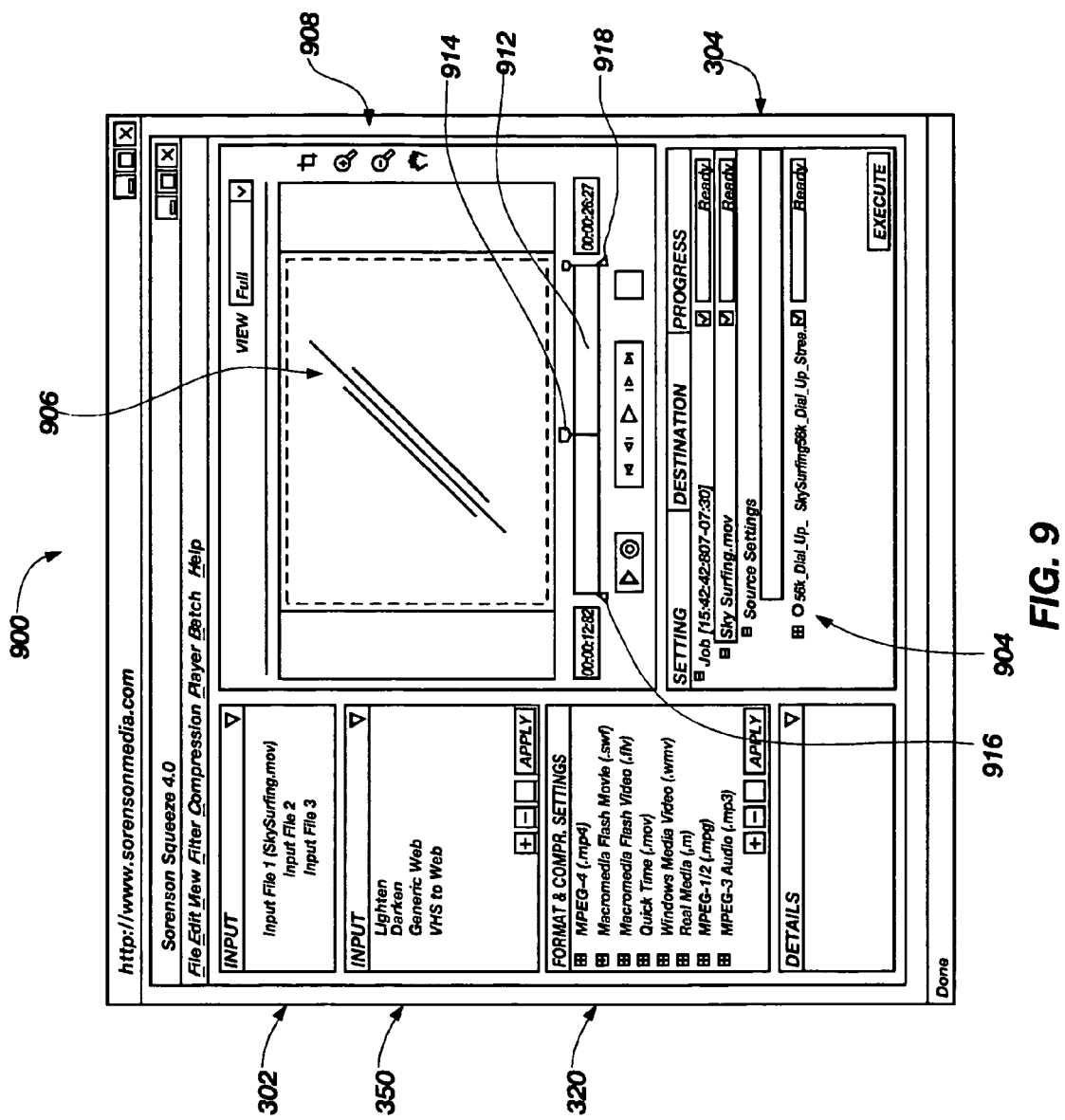
FIG. 9 is a graphical interface for generating a preview of a reformatted preview segment, in accordance with an embodiment of the present invention.

FIG. 9 is a graphical interface for generating a preview of a reformatted preview segment, in accordance with an embodiment of the present invention. A single window 900 includes a batch job pane or second interface pane 304 including at least one graphical element 904 of a selected input file and an associated reformatting process. A preview may be performed on a selected or highlighted graphical element 904 previously selected input file from input file pane 302 and having associated therewith a reformatting process from reformatting process pane 320, as described hereinabove.

The single window 900 further includes a preview pane 902 configured to generate a preview segment of reformatted data from the selected input file and the associated reformatting process. The selected input file is displayed in a preview segment display 906 with a specific portion of the data from the selected input file at a location coinciding with the position of a graphical element 914 depicting a play head or file location marker. The length or size of the selected input file is graphically represented by a file timeline indicator 912. Preview pane 902 further includes in marker graphical element 916 and out marker graphical element 918. When the input file undergoes the associated reformatting process, the portion or segment of the input file located between the in marker graphical element 916 and out marker graphical element 918 is subjected to the reformatting process with the resulting reformatted data segment being stored as reformatted data.

Figure 10:
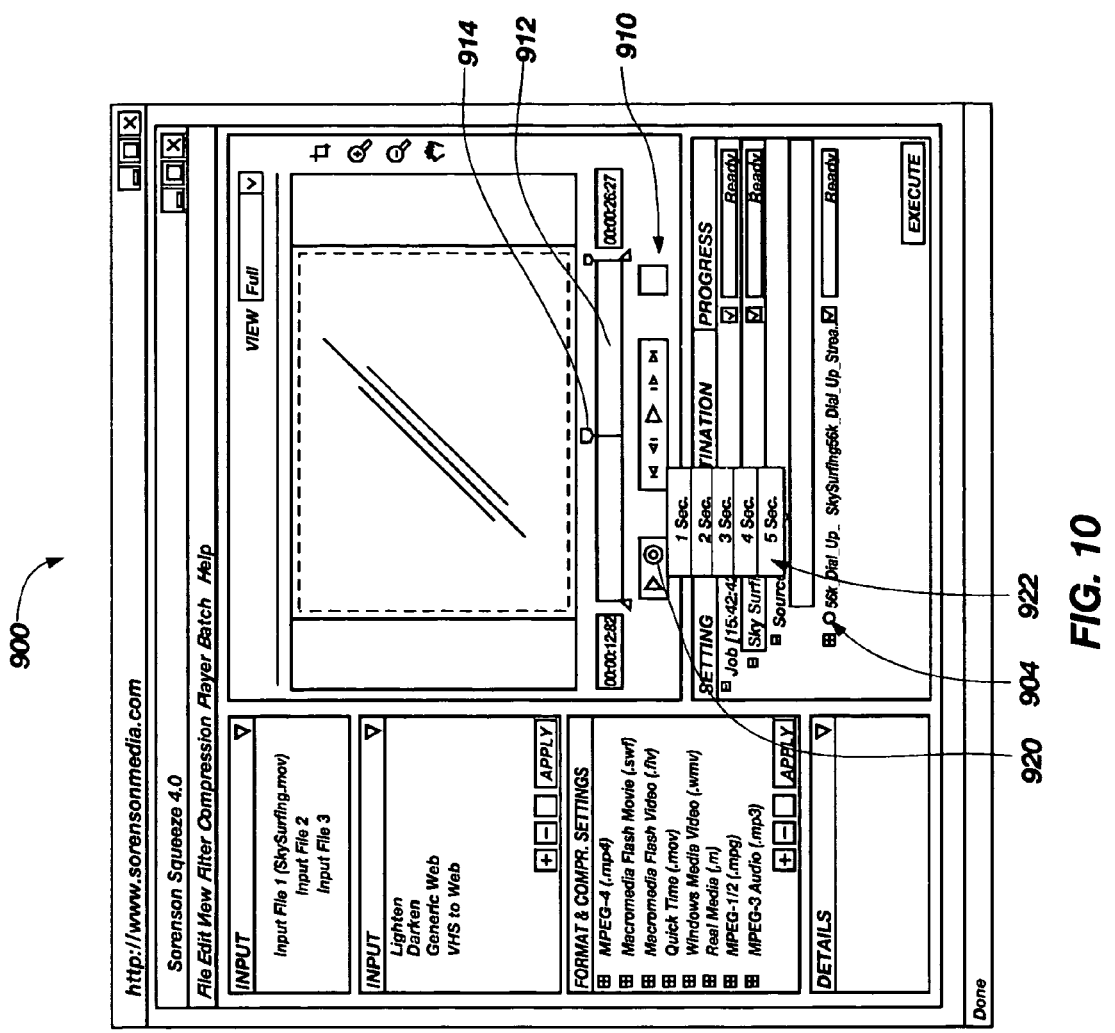
FIG. 10 is a graphical interface for selecting a preview segment for generating a preview of a reformatted preview segment, in accordance with an embodiment of the present invention.
Figure 11:
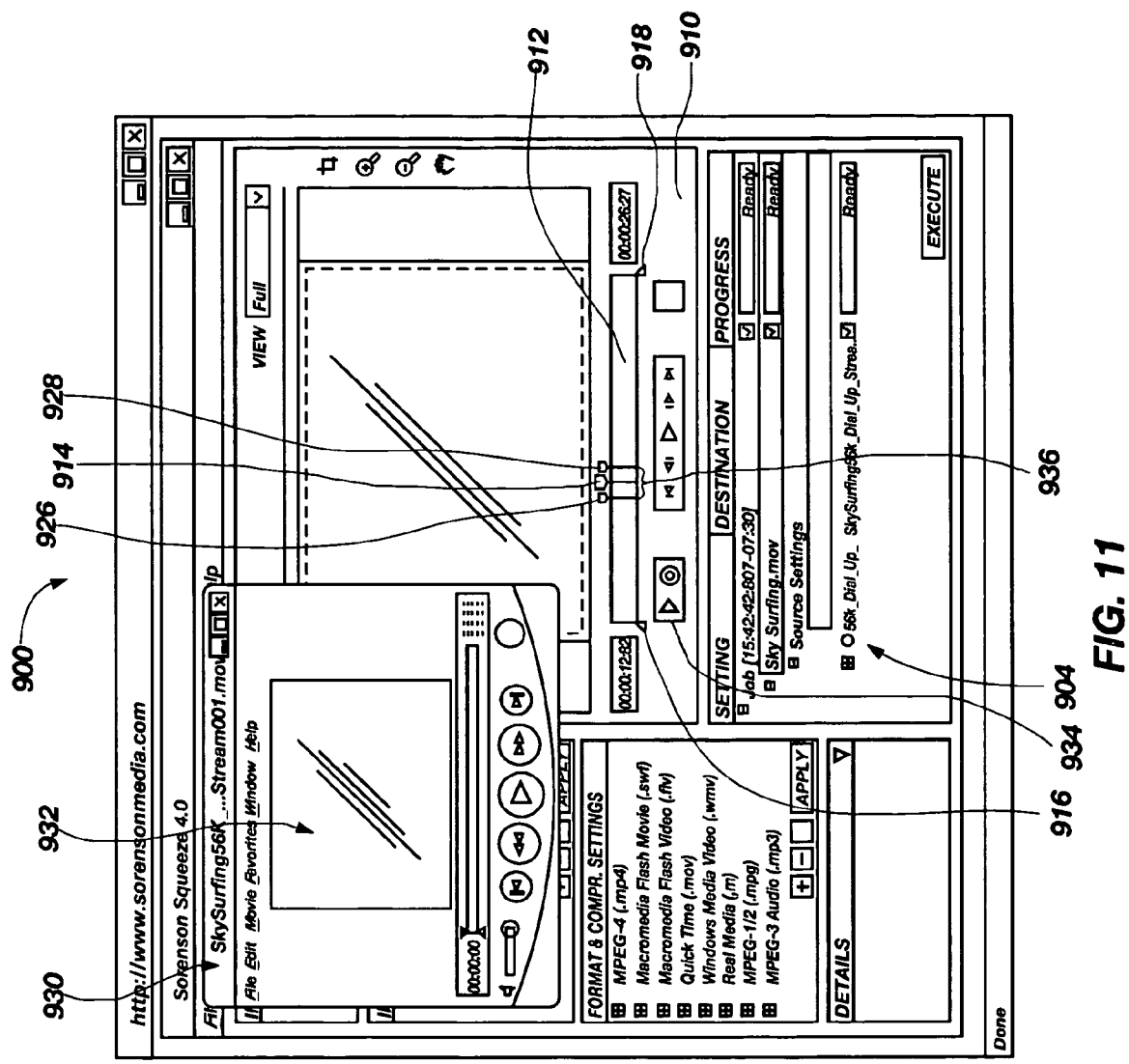
FIG. 11 is a graphical interface for viewing a preview of a reformatted preview segment, in accordance with an embodiment of the present invention.

FIGS. 10 and 11 illustrate a graphical interface for selecting a preview segment for generating a preview of a reformatted preview segment, in accordance with an embodiment of the present invention. Preview pane 902 further includes graphical elements 910 representing preview controls. A preview segment of the selected input file is identified by the placement of the play head graphical element 914 within the file timeline indicator 912 depicting the selected input file timeline. The preview segment is defined by a duration surrounding the play head graphical element 914. By way of example and not limitation, the preview segment may be established by selecting a preview segment selector 920 which activates a preview segment preset menu 922 listing one or more preset preview segment durations. Selection of one of the preview segment presets creates a preview segment 936, as illustrated with respect to FIG. 11. The preview segment 936 is bounded by a preview in marker 926 and a preview out marker 928. The preview segment identifies a portion of the selected input file that undergoes a temporary reformatting for previewing the resulting reformatted data without reformatting the entire selected input file.

Preview in marker 926 and preview out marker 928 may also be manually relocated to further refine or relocate the preview segment 936. Once the location of the preview segment 936 is acceptable, then assertion of a preview reformatting selector graphical element 934 causes the preview segment 936 to undergo the associated reformatting process. Upon completion of the reformatting process, a reformatted preview segment display 930 (e.g., a media player corresponding to the associated reformatting process) is activated and the reformatted preview segment 932 is previewed.

Figure 12:
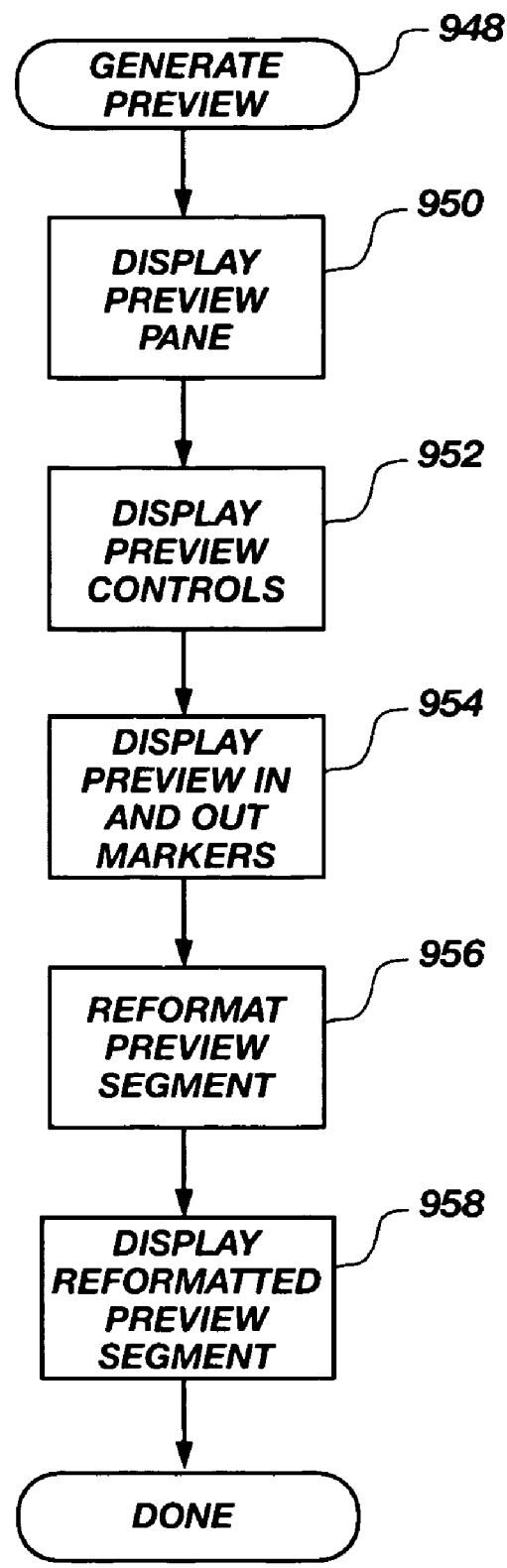
FIG. 12 is a flowchart for generating a preview of a reformatted preview segment, in accordance with an embodiment of the present invention.

FIG. 12 is a flowchart for generating a preview of a reformatted preview segment, in accordance with an embodiment of the present invention. A method 948 for generating a preview of a reformatted preview segment of reformatted data includes displaying 950 a preview pane 902 (FIG. 9) in a single window. The method further includes displaying 952 preview controls including a file timeline indicator 912 (FIG. 9) configured to graphically depict a length of a selected input file and a play head graphical element 914 (FIG. 9) configured to graphically depict a displayed location within the selected input file. Preview in marker 926 (FIG. 11) and a preview out marker 928 (FIG. 11) are displayed 954 and configured to graphically depict a preview segment 936 (FIG. 11) of the selected input file. The preview segment 936 of the selected input file is reformatted 956 into the reformatted preview segment according to a reformatting process associated to the selected input file. The method yet includes displaying 958 the reformatted preview segment of the reformatted data in the preview pane.

Figure 13:
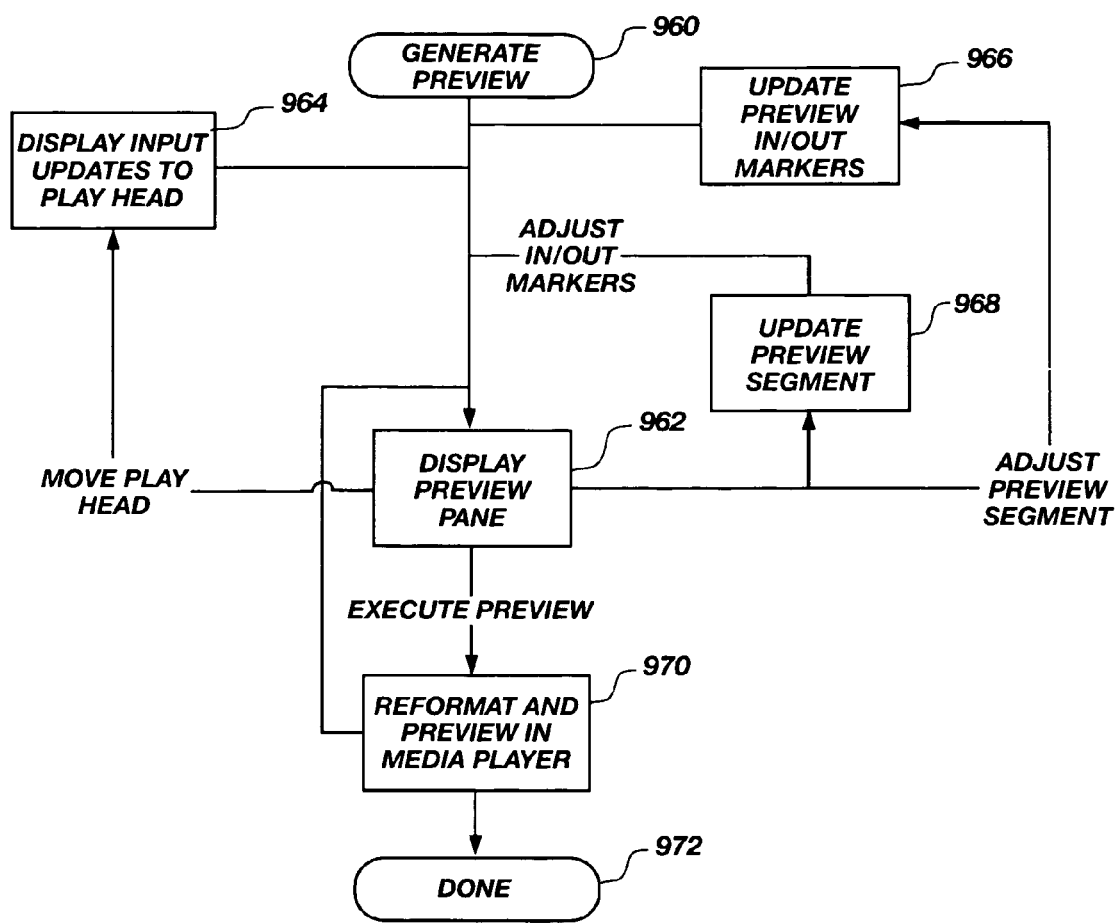
FIG. 13 is a flowchart for generating a preview of a reformatted preview segment, in accordance with another embodiment of the present invention.

FIG. 13 is a flowchart for generating a preview of a reformatted preview segment, in accordance with another embodiment of the present invention. A method 960 for generating a preview of a reformatted preview segment of reformatted data includes displaying 962 a preview pane 902 (FIG. 9) in a single window when an input file is selected from at least one graphical element 904 of a selected input file and an associated reformatting process as resident within a second interface pane 304. A specific frame, identified by the location of the play head, of the selected input file is displayed within the preview pane 902. When the play head is moved, the current frame is updated 964 and processing returns to continue displaying 962 the current frame of the input file.

The preview segment 936 (FIG. 11) and preview in and preview out markers 926, 928 may be updated 966 to modify the length and position of the preview segment and processing returns to continue displaying 962 the current frame of the input file. The in and out marker graphical elements 916 and 918 may also be updated 968 to modify the file timeline indicator 912 (FIG. 9) configured to graphically depict a length of a selected input file and processing returns to continue displaying 962 the current frame of the input file. When reformatting and preview are selected, the preview segment 936 (FIG. 11) of the selected input file is reformatted and displayed 970 in a reformatted preview segment display 930 (e.g., a media player corresponding to the associated reformatting process is activated) and the reformatted preview segment 932 is previewed until complete 972.

Although the present invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A method for generating a preview of a reformatted preview segment of a selected input file, comprising:
 for a single graphical window:
  associating each of a plurality of input file graphical elements with a corresponding branch of a batch job tree in a first portion of the single graphical window responsive to a user graphically repositioning each of the plurality of input file graphical elements to the first portion;
  globally associating a first reformatting processes to each of the plurality of input file graphical elements in each branch of the batch job tree;
  locally associating a second reformatting process to one of the plurality of input file graphical elements associated with a selected input file;
  displaying a preview pane;
  displaying preview controls including a file timeline indicator configured to graphically depict a time length of the selected input file and a play head configured to graphically depict a displayed location within said selected input file;

identifying a segment of the selected input file to be reformatted and previewed, wherein the identified segment has a duration of time shorter than a duration of time of the selected input file;

displaying a preview in marker and a preview out marker configured to graphically depict the identified segment of said selected input file;

reformatting said identified segment of said selected input file into a temporary reformatted preview segment according to the second reformatting process, wherein reformatting said identified segment occurs prior to reformatting the entire selected input file according to the second reformatting process;

displaying said temporary reformatted preview segment in said preview pane without beginning a process to reformat the selected input file entirely; and converting all of the selected input file to a compressed output file format according to the second reformatting process and responsive to activation by the user.

2. The method of claim 1, wherein said preview controls further include an in marker and an out marker configured to depict a reformatting segment of said selected input file, said in marker and said out marker being independent of said preview in marker and said preview out marker.

3. The method of claim 1, wherein said preview controls further include a preview segment selector configured to position said preview in marker and said preview out marker around a location of said play head.

4. The method of claim 3, wherein said preview segment selector includes one or more preview segment presets of varying preview durations of time.

5. The method of claim 3, wherein said preview in marker and said preview out marker are each independently moved to modify said preview segment selector.

6. The method of claim 1, wherein said displaying said temporary reformatted preview segment further comprises activating a corresponding reformatted data player corresponding to said associated reformatting process for displaying said temporary reformatted preview segment of said selected input file.

7. The method of claim 1, wherein said selected input file is selected from one or more input files in a reformatting batch job.

8. A graphical interface stored on a non-transitory computer-readable medium for generating a preview of a reformatted preview segment of reformatted data, the graphical interface comprising:

a reformatting interface pane in a single window including a reformat selector for activating execution of a batch job associated with a batch job tree, the reformatting interface pane configured to:

associate each of a plurality of input file graphical elements with a corresponding branch of the batch job tree in a first portion of the single window responsive to a user graphically repositioning each of the plurality of input file graphical elements to the first portion;

globally associating a first reformatting processes to each of the plurality of input file graphical elements in each branch of the batch job tree;

locally associate a second reformatting process to one of the plurality of input file graphical elements associated with a selected input file;

a preview pane of said single window including preview controls, wherein the preview controls include a file timeline indicator configured to graphically depict a time length of the selected input file, a preview in marker and a preview out marker configured to graphically depict an identified segment of said selected input file to be temporarily reformatted and previewed, wherein the time length of the identified segment is shorter than the time length of the selected input file;

means for:

reformatting said identified segment of said selected input file into a temporary reformatted preview segment according to the second reformatting process prior to beginning a process to reformat the entire selected input file according to the second reformatting process; and reformatting all of the selected input file upon activation of the reformat selector; and a reformatted preview display of said single window displaying said temporary reformatted preview segment of said reformatted data in said single window.

9. The graphical interface of claim 8, wherein said preview controls further comprise an in marker and an out marker configured to depict a reformatting segment of said selected input file, said in marker and said out marker being independent of said preview in marker and said preview out marker.

10. The graphical interface of claim 8, wherein said preview controls further include a preview segment selector configured to position said preview in marker and said preview out marker around a location of a play head.

11. The graphical interface of claim 10, wherein said preview segment selector includes one or more preview segment presets of varying preview durations of time.

12. The graphical interface of claim 10, wherein said preview in marker and said preview out marker are each independently moved to modify said preview segment selector.

13. The graphical interface of claim 8, wherein said displaying said temporary reformatted preview segment further comprises activating a corresponding reformatted data player corresponding to said associated reformatting process for displaying said temporary reformatted preview segment of said selected input file.

14. The graphical interface of claim 8, wherein said selected input file is selected from one or more input files in a reformatting batch job.

15. A non-transitory computer-readable medium having computer-executable instructions thereon for a method for generating a preview of a reformatted preview segment, the method comprising:

for a single graphical window:

associating each of a plurality of input file graphical elements with a corresponding branch of a batch job tree in a first portion of the single graphical window responsive to a user graphically repositioning each of the plurality of input file graphical elements to the first portion;

globally associating a first reformatting processes to each of the plurality of input file graphical elements in each branch of the batch job tree;

locally associating a second reformatting process to one of the plurality of input file graphical elements associated with a selected input file;

displaying a preview pane;

displaying preview controls including a file timeline indicator configured to graphically depict a time length of the selected input file and a play head configured to graphically depict a displayed location within said selected input file;

identifying a segment of the selected input file to be reformatted and previewed, wherein the identified segment has a duration of time shorter than a duration of time of the selected input file;

displaying a preview in marker and a preview out marker configured to graphically depict the identified segment of said selected input file;

reformatting said identified segment of said selected input file into a temporary reformatted preview segment according to the second reformatting process, wherein reformatting said identified segment occurs prior to reformatting the entire selected input file according to the second reformatting process; and displaying said temporary reformatted preview segment in said preview pane without beginning a process to reformat the selected input file entirely; and converting all of the selected input file to a compressed output file format according to the second reformatting process and responsive to activation by the user.

16. The computer-readable medium of claim 15, including computer-executable instructions thereon, wherein said preview controls further comprise an in marker and an out marker configured to depict a reformatting segment of said selected input file, said in marker and said out marker being independent of said preview in marker and said preview out marker.

17. The computer-readable medium of claim 15, including computer-executable instructions thereon, wherein said preview controls further include a preview segment selector configured to position said preview in marker and said preview out marker around a location of said play head.

18. The computer-readable medium of claim 17, including computer-executable instructions thereon, wherein said preview segment selector includes one or more preview segment presets of varying preview durations of time.

19. The computer-readable medium of claim 17, including computer-executable instructions thereon, wherein said preview in marker and said preview out marker are each independently moved to modify said preview segment selector.

20. The computer-readable medium of claim 15, including computer-executable instructions thereon, wherein said displaying said temporary reformatted preview segment further comprises activating a corresponding reformatted data player corresponding to said associated reformatting process for displaying said temporary reformatted preview segment of said selected input file.

21. The computer-readable medium of claim 15, including computer-executable instructions thereon, wherein said selected input file is selected from one or more input files in a reformatting batch job.

* * * * *

UNITED STATES PATENT AND TRADEMARK OFFICE
CERTIFICATE OF CORRECTION

| | | |
|---|---|---|
| PATENT NO. | : 8,296,649 B2 | Page 1 of 2 |
| APPLICATION NO. | : 11/140784 | |
| DATED | : October 23, 2012 | |
| INVENTOR(S) | : Randon Morford et al. | |

It is certified that error appears in the above-identified patent and that said Letters Patent is hereby corrected as shown below:

In the drawings:
    Please replace FIG. 1 with the following amended Figure:

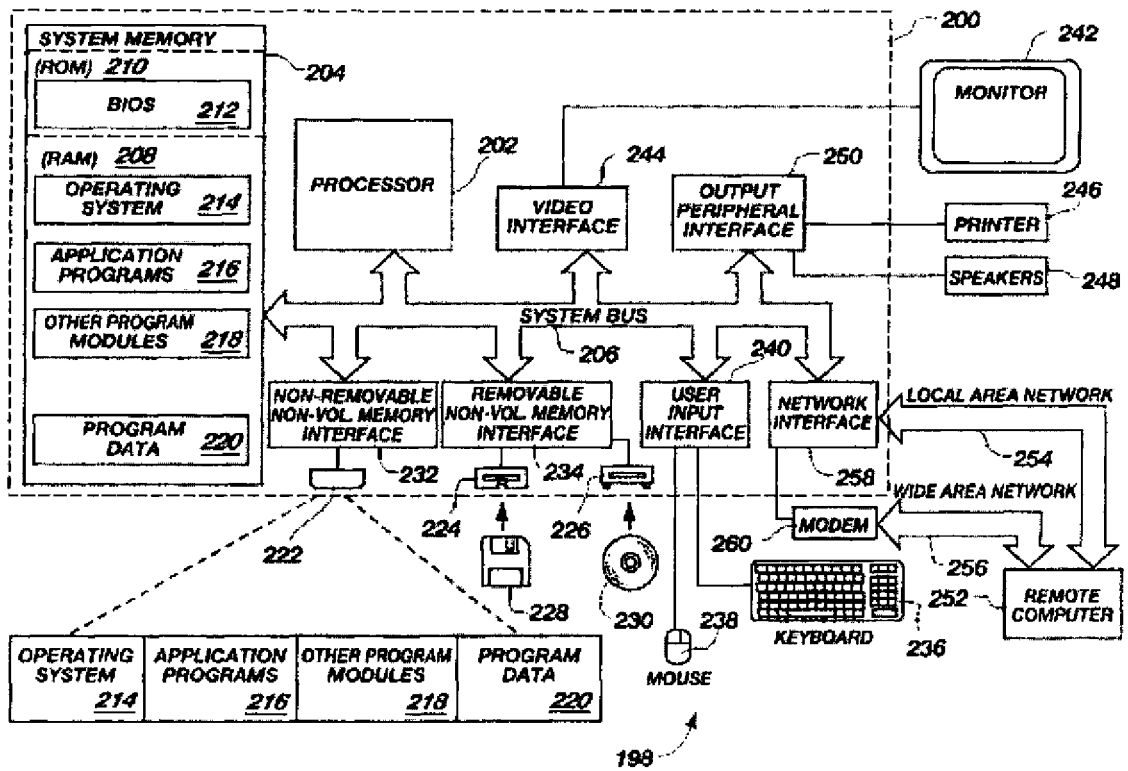

In FIG. 1,      delete uppermost lead line from reference numeral --242--

Signed and Sealed this
Eighth Day of April, 2014

Michelle K. Lee
*Deputy Director of the United States Patent and Trademark Office*

CERTIFICATE OF CORRECTION (continued)
U.S. Pat. No. 8,296,649 B2

Please replace FIG. 2 with the following amended Figure:

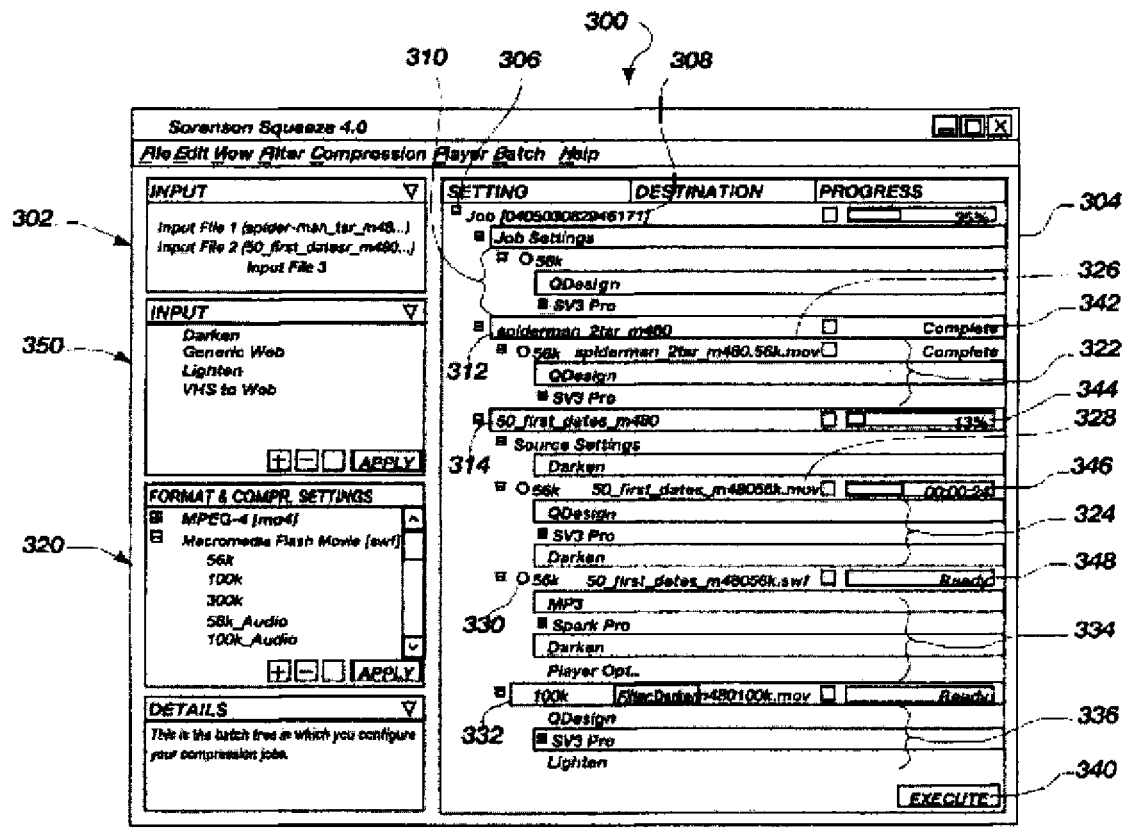

FIG. 2

In FIG. 2, change four occurrences of "QDesing" to --QDesign--

In the specification:

| | | |
|---|---|---|
| COLUMN 8, | LINE 10 | change "refoimatting" to --reformatting-- |
| COLUMN 9, | LINE 48, | change "segment" to --segment 936-- |
| COLUMN 10, | LINE 13, | change "pane." to --pane 902.-- |
| COLUMN 10, | LINE 20, | change "904" to --904 (FIG. 9)-- |
| COLUMN 10, | LINE 22, | change "304." to --304 (FIG. 9).-- |

In the claims:

| | | | |
|---|---|---|---|
| CLAIM 1, | COLUMN 10, | LINE 59, | change "processes" to --process-- |
| CLAIM 8, | COLUMN 11, | LINE 60, | change "associating" to --associate-- |
| CLAIM 8, | COLUMN 11, | LINE 60, | change "processes" to --process-- |
| CLAIM 15, | COLUMN 12, | LINE 56, | change "processes" to --process-- |